United States Patent
Kiehl

(10) Patent No.: US 10,104,271 B2
(45) Date of Patent: Oct. 16, 2018

(54) MODULAR UNIT FOR A MOTOR VEHICLE

(71) Applicant: HUF Hülsbeck & Fürst GmbH & Co. KG, Velbert (DE)

(72) Inventor: Erik Kiehl, Ratingen (DE)

(73) Assignee: Hug Hülsbeck & Fürst GmbH & Co. KG, Velbert (DE)

( * ) Notice: Subject to any disclaimer, the term of this patent is extended or adjusted under 35 U.S.C. 154(b) by 362 days.

(21) Appl. No.: 14/973,066

(22) Filed: Dec. 17, 2015

(65) Prior Publication Data
US 2016/0176346 A1 Jun. 23, 2016

(51) Int. Cl.
| | | |
|---|---|---|
| *E05F 15/20* | (2006.01) | |
| *H04N 5/225* | (2006.01) | |
| *B62D 33/027* | (2006.01) | |
| *B60R 11/04* | (2006.01) | |
| *B60R 11/00* | (2006.01) | |

(52) U.S. Cl.
CPC ........... *H04N 5/2253* (2013.01); *B60R 11/04* (2013.01); *B62D 33/027* (2013.01); *H04N 5/2251* (2013.01); *H04N 5/2252* (2013.01); *B60R 2011/004* (2013.01); *B60R 2011/0082* (2013.01); *B60R 2011/0092* (2013.01); *B60R 2011/0094* (2013.01)

(58) Field of Classification Search
CPC .. B62D 33/027; H04N 5/2252; H04N 5/2253; H04N 5/2251; H04N 5/225; B60R 11/04; B60R 2011/004; B60R 2011/0082; B60R 2011/0092; B60R 2011/0094
USPC .......................................... 49/31, 62, 67, 501
See application file for complete search history.

(56) References Cited

U.S. PATENT DOCUMENTS

| | | | | | |
|---|---|---|---|---|---|
| 4,815,757 | A | * | 3/1989 | Hamilton | ................ B60R 11/04 182/69.4 |
| 6,023,224 | A | * | 2/2000 | Meyvis | ................... E05B 47/00 315/153 |
| 6,049,287 | A | * | 4/2000 | Yulkowski | ............... A62C 2/24 292/251.5 |

(Continued)

FOREIGN PATENT DOCUMENTS

DE   10 2009 060425 A1   6/2011

OTHER PUBLICATIONS

USPTO, Non-Final Office Action for U.S. Appl. No. 14/973,408, dated Oct. 4, 2017.

*Primary Examiner* — Chi Q Nguyen
(74) *Attorney, Agent, or Firm* — Honigman Miller Schwartz and Cohn LLP; Matthew H. Szalach; Jonathan P. O'Brien

(57) ABSTRACT

A modular unit comprises at least one camera unit for sensing an outside area, an actuating unit for opening and/or closing a door or gate of a motor vehicle, and a coupling unit for connecting the camera unit and the actuating unit. The modular unit is located on a movable door or gate of the motor vehicle. The camera unit can be brought into an operating position upon activation of the actuating unit. In the operating position, the camera unit actively visually senses the outside area located behind the motor vehicle. Upon activation of the actuating unit, the gate or door can be brought into an open position and the camera unit can be brought into the operating position by the coupling unit. The camera unit is in an active operating position for sensing the outside area located behind the motor vehicle when the gate is open.

21 Claims, 7 Drawing Sheets

(56) References Cited

U.S. PATENT DOCUMENTS

| | | | |
|---|---|---|---|
| 6,182,402 B1 * | 2/2001 | Aalst | E06B 7/30 49/15 |
| 6,819,231 B2 | 11/2004 | Berberich et al. | |
| 7,236,088 B2 | 6/2007 | Matsukawa et al. | |
| 7,280,035 B2 | 10/2007 | McLain et al. | |
| 7,480,149 B2 * | 1/2009 | DeWard | B60R 11/04 340/438 |
| 7,547,058 B2 | 6/2009 | King et al. | |
| 7,748,083 B2 * | 7/2010 | Feinauer | E05D 3/16 16/319 |
| 7,891,886 B2 | 2/2011 | Schuetz | |
| 8,118,501 B2 | 2/2012 | Buschmann | |
| 8,830,317 B2 | 9/2014 | Meier | |
| 9,068,390 B2 | 6/2015 | Ihlenburg et al. | |
| 9,308,802 B2 | 4/2016 | Warburton et al. | |
| 9,429,816 B2 | 8/2016 | Augst | |
| 9,487,160 B2 * | 11/2016 | Buschmann | B60R 11/04 |
| 9,562,323 B2 * | 2/2017 | Heinola | D21C 11/12 |
| 9,689,191 B1 | 6/2017 | Kim | |
| 9,725,049 B2 | 8/2017 | Buschmann | |
| 9,744,914 B2 | 8/2017 | Barthel et al. | |
| 9,762,777 B2 | 9/2017 | Dadeppo et al. | |
| 2002/0003571 A1 | 1/2002 | Schofield et al. | |
| 2003/0041329 A1 | 2/2003 | Bassett | |
| 2004/0119823 A1 | 6/2004 | Takagi et al. | |
| 2006/0048449 A1 * | 3/2006 | Roques | B64C 1/1407 49/62 |
| 2006/0171704 A1 | 8/2006 | Bingle et al. | |
| 2008/0307711 A1 * | 12/2008 | Kern | E05C 17/305 49/501 |
| 2009/0000196 A1 | 1/2009 | Kollar et al. | |
| 2009/0040300 A1 | 2/2009 | Scribner | |
| 2009/0128629 A1 | 5/2009 | Egbert et al. | |
| 2009/0135253 A1 | 5/2009 | Augst | |
| 2009/0309971 A1 | 12/2009 | Schuetz | |
| 2012/0007984 A1 | 1/2012 | Schutz | |
| 2013/0182112 A1 | 7/2013 | Liepold et al. | |
| 2014/0168437 A1 | 6/2014 | Rother et al. | |
| 2014/0197649 A1 | 7/2014 | Hansen | |
| 2014/0207344 A1 | 7/2014 | Ihlenburg et al. | |
| 2015/0300073 A1 | 10/2015 | Ihlenburg et al. | |
| 2017/0297540 A1 * | 10/2017 | Zhang | B08B 3/02 |

* cited by examiner

MODULAR UNIT FOR A MOTOR VEHICLE

CROSS REFERENCE TO RELATED APPLICATIONS

This application claims priority to German Patent Application No. DE102014018686.5, filed Dec. 18, 2014, the disclosure of which is incorporated by reference in its entirety.

TECHNICAL FIELD

The invention concerns a modular unit having at least one camera unit for sensing an outside area and having an actuating unit for opening and/or closing a door or gate, in particular tailgate, of a motor vehicle, wherein the modular unit is located on a movable door or gate of the motor vehicle, wherein the camera unit can be brought into an operating position upon activation of the actuating unit, and in the operating position the camera unit actively visually senses the outside area located behind the motor vehicle.

BACKGROUND

This section provides background information related to the present disclosure which is not necessarily prior art. Known from the prior art is, for example, a motor vehicle commonly referred to as a pickup truck with a cargo area that has a hinged tailgate. In order to acquire images of the area behind the motor vehicle with a camera unit, the camera unit is integrated into the gate. When the gate is operated, the gate is moved to its open position. In this process, the gate is moved by at least 90° from its position perpendicular to the ground into a horizontal position. This has the result that the camera unit is aimed toward the ground, so that the area behind the vehicle is no longer sensed visually, but instead only the area of the ground located directly below the opened gate. If a user of the pickup truck wishes to drive in reverse with opened gate to approach an unloading point, visualization of an unloading point located behind the motor vehicle is not possible. In order to drive precisely to the unloading point, in particular to an edge of the unloading point, the user of the vehicle must be guided by hand signals from another person, or the user must himself exit the vehicle to verify the distance to the edge of the unloading point. This considerably reduces convenience for the user, since he is either dependent on the help of another person or must exit the motor vehicle. This problem is not restricted to pickup trucks, but also exists for vans that have a large gate that can be moved upward into the horizontal position.

It is thus the object of the invention to improve convenience when a motor vehicle is driven in reverse.

SUMMARY

This section provides a general summary of the disclosure, and is not a comprehensive disclosure of its full scope or all of its features.

In accordance with the principles of the present disclosure, a modular unit for a vehicle is provided. The module unit includes a mechanical and/or electrical coupling unit for connecting a camera unit and an actuating unit. Upon activation of the actuating unit a gate or door can be brought into an open position and the camera unit can also be brought into the operating position, by the coupling unit. In the operating position, the camera unit may sense the outside area located behind the motor vehicle even when the gate is open. The outside area behind the vehicle sensed by the camera unit may include a part of the ground as well as a plane that is perpendicular to the ground. The outside area located behind the vehicle thus is not exclusively the area at ground level. The gate is opened by actuation of the actuating unit, implemented as, e.g., a door handle. As this occurs, the camera unit is activated, wherein "activation" or "active" may include the camera unit sensing the outside world. For example, the camera unit may visualize or capture images of the outside world and display the images on an internal or external display device. The camera unit is also active when the gate or door is in the open position so that the user reliably detects visually, on the display device, the people or objects located behind the vehicle. An additional camera unit for visualization of the outside area located behind the vehicle may be dispensed with. The user may open the gate by means of the actuating device, and the coupling unit may cause the camera unit to be in its active operating position even with the gate or door open. Now if the user drives his motor vehicle in reverse, he will conveniently and reliably sense the outside area behind the motor vehicle despite the open gate or door. In this way, it is possible to eliminate the necessity for the driver to exit his vehicle in order to verify the distance to an obstacle, such as, e.g., a loading dock. The coupling unit ensures a reliable and convenient linking of the actuating mechanism with the camera unit, and consequently improves convenience for the user.

The modular unit is very compact if the actuating unit includes a housing, in particular a shell, in which a support bracket, in particular a pivoting support bracket, is located.

In some implementations, the support bracket includes a recessed handle and a camera housing for the camera unit, in which the camera unit is arranged, in particular in a sealing manner. Similarly, connecting cables for the camera unit as well as an electric drive provided for the camera unit are protected from external environmental influences in the camera housing. This measure additionally ensures that the camera unit is arranged in the modular unit in a compact and secure manner. At the same time, the support bracket serves as a recessed handle which the user grasps to open the gate or door. The support bracket thus has two functions. This reduces costs for the modular unit and at the same time provides a compact design of the modular unit.

The construction of the modular unit is very compact and convenient when the lever and/or the support bracket are designed to rotate about a pivot located on the housing. This lever serves as the actuating element for operating the actuating unit. Operating the lever initiates the process of opening the gate and the door, and moves the camera unit located in the support bracket into its active operating position.

The construction of the modular unit is very compact and economical when the same pivot is provided both for the support bracket and for the lever. This offers the advantage that another additional pivot may be dispensed with. Consequently, the overall weight of the modular unit is reduced as well. The structural design of the modular unit becomes even more compact, so that the modular unit can be installed in the door or gate even when there is only limited installation space.

In some implementations, the lever is rotatable about a pivot located on the housing. In this way, a compact arrangement of the modular unit is ensured, and the installation space for the modular unit may be reduced.

In some implementations, the support bracket includes an opening or recess, and the lever is located inside the opening or recess, in particular in a pivoting manner. This design of the modular unit may help to ensure that a coupling is provided between the actuating unit and the support bracket when the actuating handle is operated. Especially when only minimal installation space is available for accommodating the modular unit in the gate or door, the provision of the opening or recess ensures a secure, reliable, and compact design of the modular unit.

In some implementations, the support bracket, in particular a stop surface formed on the support bracket as a coupling surface, and the lever constitute the coupling unit. As a result of this compact arrangement, the support bracket has a coupling function in addition to accommodation of the actuating unit. Consequently, the support bracket has at least a dual function.

If the support bracket serves as the camera housing for the camera unit, then the support bracket could even have a third function. The support bracket is thus implemented as a multifunction support bracket. The support bracket firstly serving to mount the camera unit, secondly serving to accommodate the actuating unit, and thirdly serving as a component of the coupling unit. As a result of the fact that the support bracket fulfills multiple functions and that these functions can be located in a single support bracket, the modular unit becomes more economical with regard to its structural design, and compactness of the modular unit is further improved. In addition, the camera unit in the camera housing is better protected from external environmental influences.

The compactness of the modular unit is further improved if the support bracket is equipped with a protective device, in particular a hinged protective device, such as a protective lid, that can be set in motion by an electric drive or can be set in motion by a movement of an image acquisition unit associated with the camera unit when the image acquisition unit extends. The protective device prevents dirt and moisture from entering the region of the support bracket that is provided to accommodate the camera unit. As a result of the protective device located on the support bracket, the support bracket has another function associated with it that makes the modular unit even more compact in design.

In some implementations, the module unit includes at least one switch unit, in particular a limit switch unit, for deactivating or activating an electric drive unit associated with the camera unit and/or for deactivating or activating the image acquisition unit. As a result of this measure, the power consumption of the camera unit and/or the image acquisition unit can be reduced because actuating the switch unit causes the electric drive to be switched off, or the image acquisition unit is only activated once the switch unit is actuated in order to acquire images of the outside area behind the motor vehicle. Moreover, the switch unit serves as a signal transmitter for detecting an error message if a limit position of the camera unit is not reached. Then, a warning that image acquisition of the outside area by the camera unit is impaired and/or inadequate is displayed to the user, for example on his vehicle's dashboard, in particular while he is driving the vehicle in reverse.

In some implementations, at least one damping element that is located at least partially between the housing and the support bracket when the support bracket is in the rest position is located on the housing and/or on the support bracket. The damping element reliably ensures that noise is minimized when the support bracket strikes the housing, and at the same time that the housing and/or the support bracket remain undamaged even after a long lifetime of the motor vehicle. The damping element may be made of an elastic and weatherproof elastomeric material, in particular rubber.

The costs for the modular unit are reduced further when the lever has an energy storage device and is unstressed in its rest position. As a result, it may be possible to dispense with an electric drive that is otherwise necessary for moving the lever. The energy storage device is economical to manufacture, and can be placed in the modular unit easily and compactly, especially when the energy storage device is implemented as a spring element, for example as a spiral spring. The energy storage device ensures that the lever automatically returns to its non-actuated position from the actuated position.

The drive for the movement of the support bracket may be simple and economical to implement when the support bracket is equipped with an energy storage device, wherein the energy storage device is unstressed in the rest position of the support bracket. The energy storage device ensures that the support bracket automatically returns to the rest position from the operating position. In order to reduce costs for the modular unit, the same energy storage device may be used for the lever and the support bracket.

Convenience for the user is further improved when the support bracket can be moved out of and/or into the housing by means of an electric drive.

The modular unit may be implemented on a motor vehicle such as a pickup truck or van, wherein the gate of the pickup truck or van is designed to pivot by at least 90° from its closed position. With these motor vehicles, the modular unit according to the invention ensures that the outside area is sensed reliably and accurately.

Further areas of applicability will become apparent from the description provided herein. The description and specific examples in this summary are intended for purposes of illustration only and are not intended to limit the scope of the present disclosure.

DESCRIPTION OF THE DRAWINGS

The drawings described herein are for illustrative purposes only of selected embodiments and not all possible implementations, and are not intended to limit the scope of the present disclosure.

The invention is illustrated on the basis of an exemplary embodiment which can be used, for example, for pickup trucks, shown in FIGS. 1 and 2, as well as for vans, shown in FIGS. 6 and 7.

The diagrammatic figures show:

Figure 1:
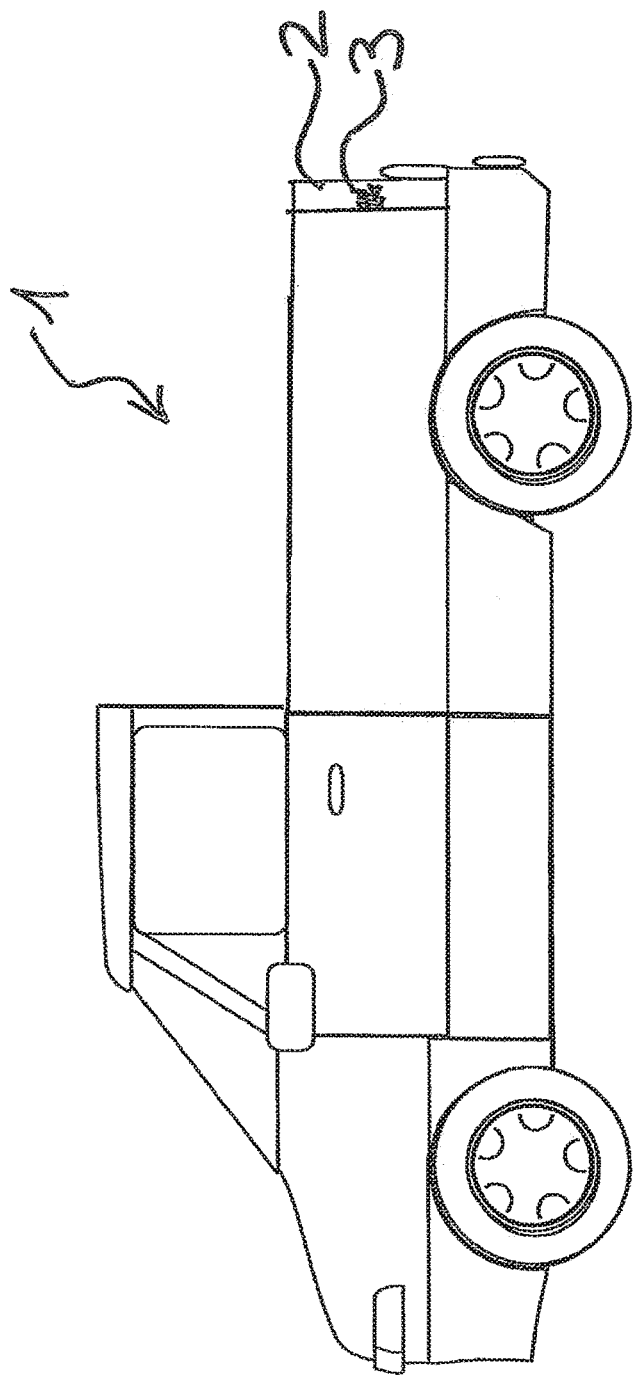
Figure 2:
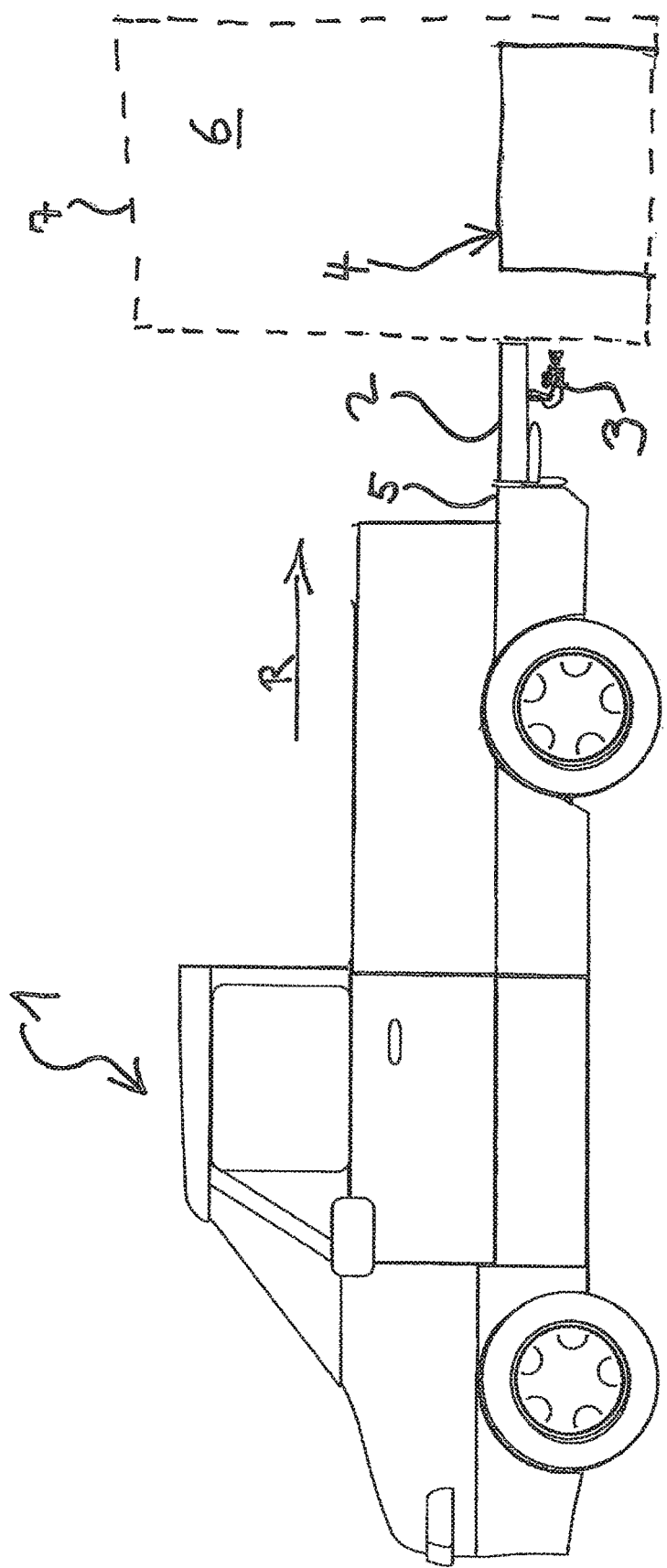
Figure 3:
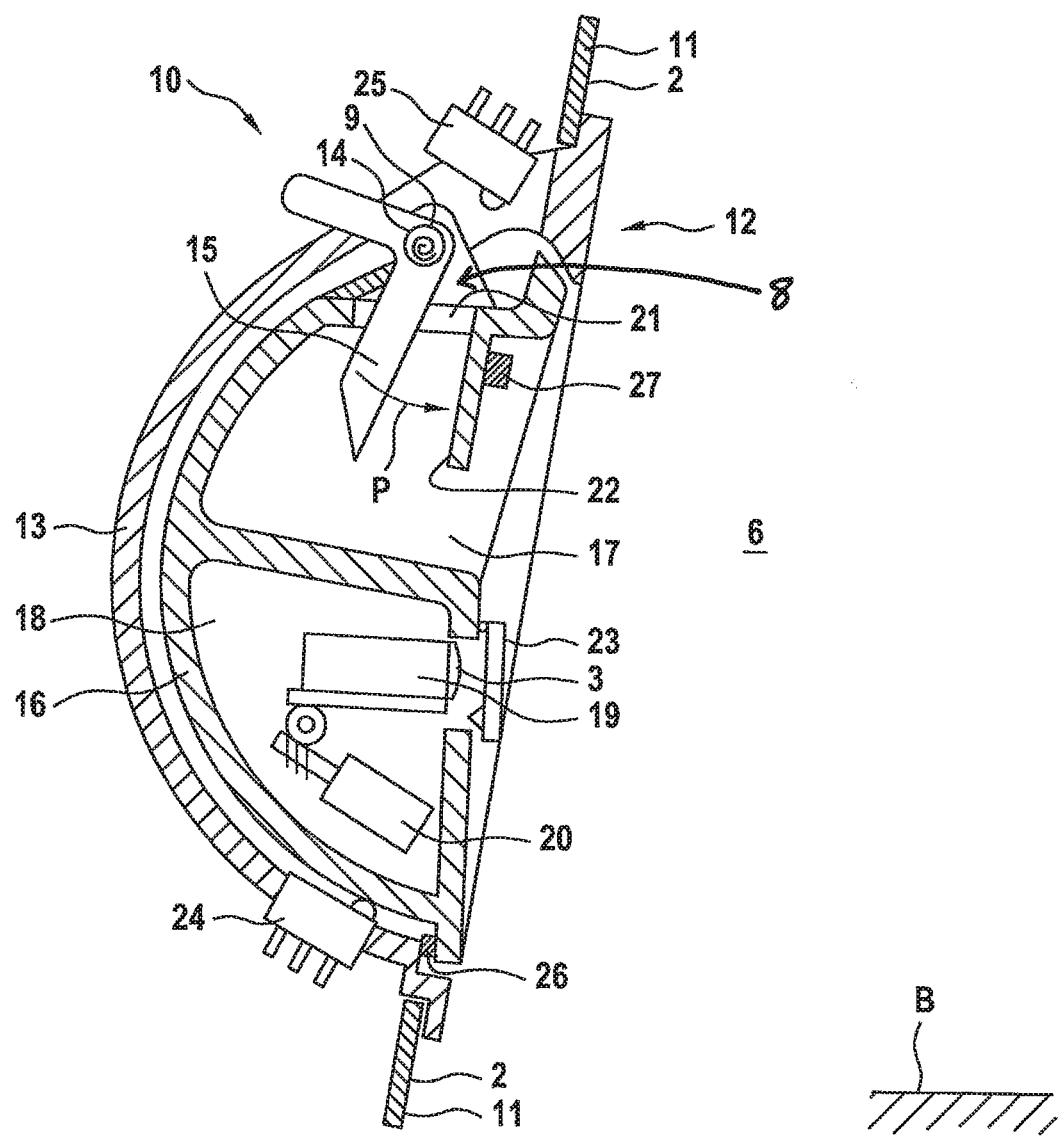
Figure 4:
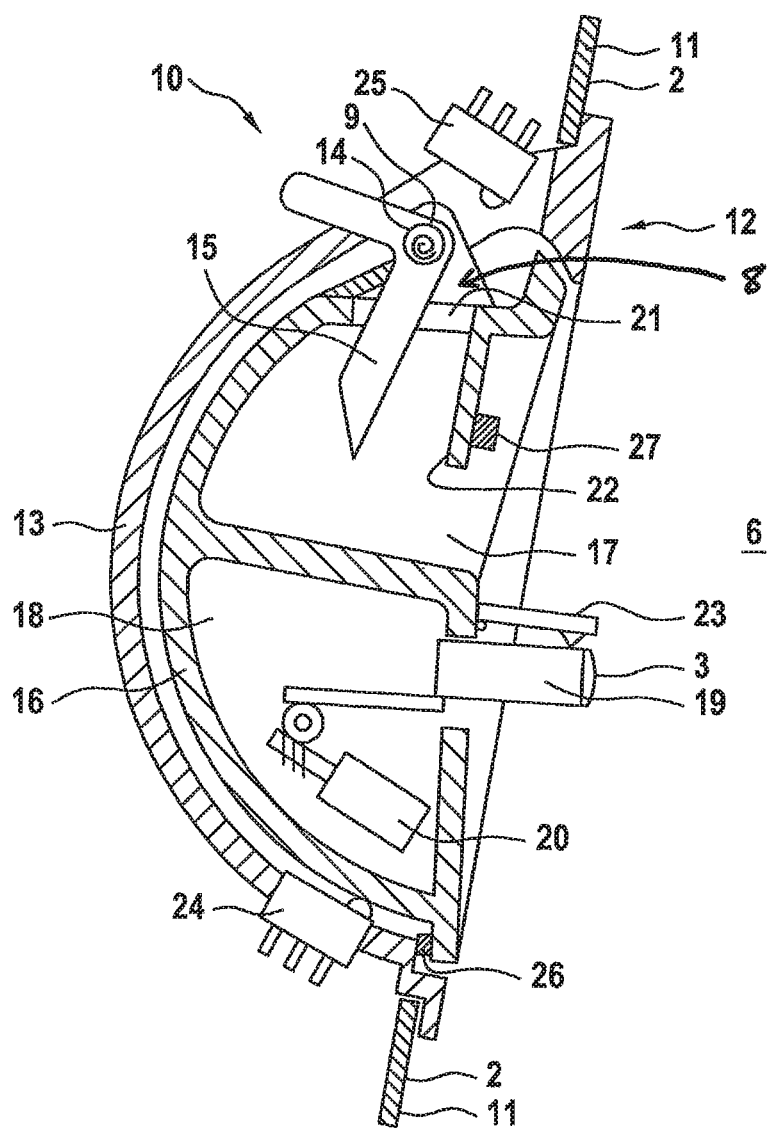
Figure 5:
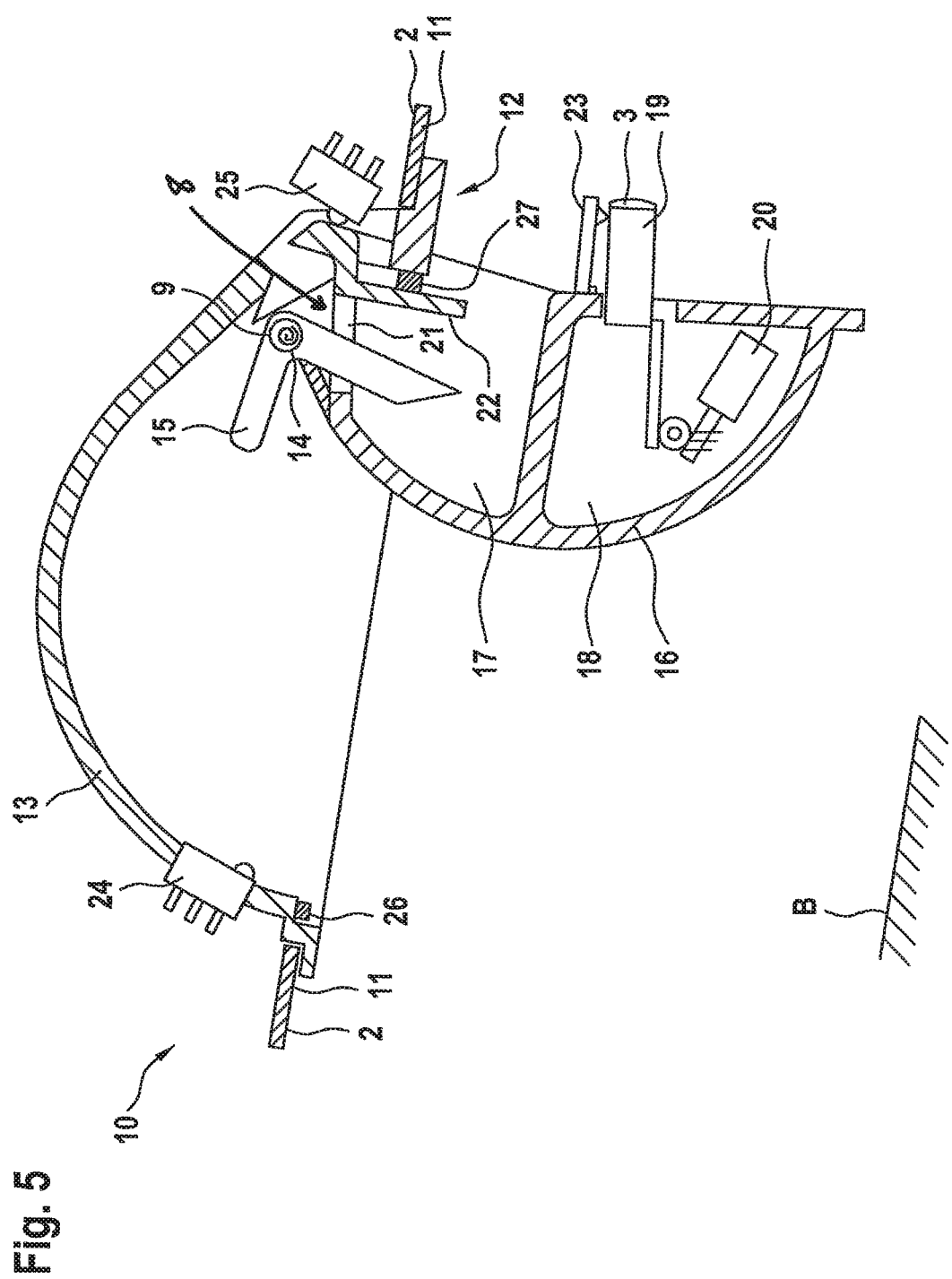
Figure 6:
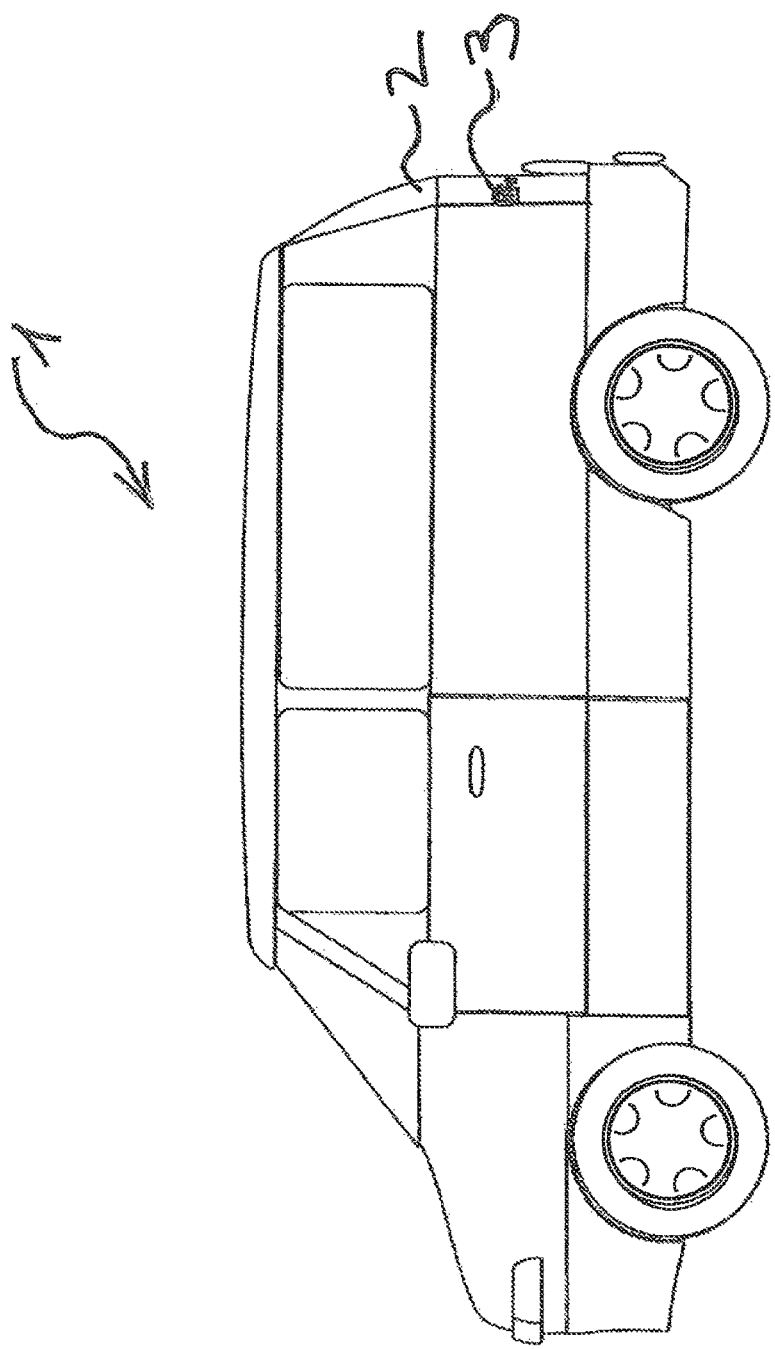
Figure 7:
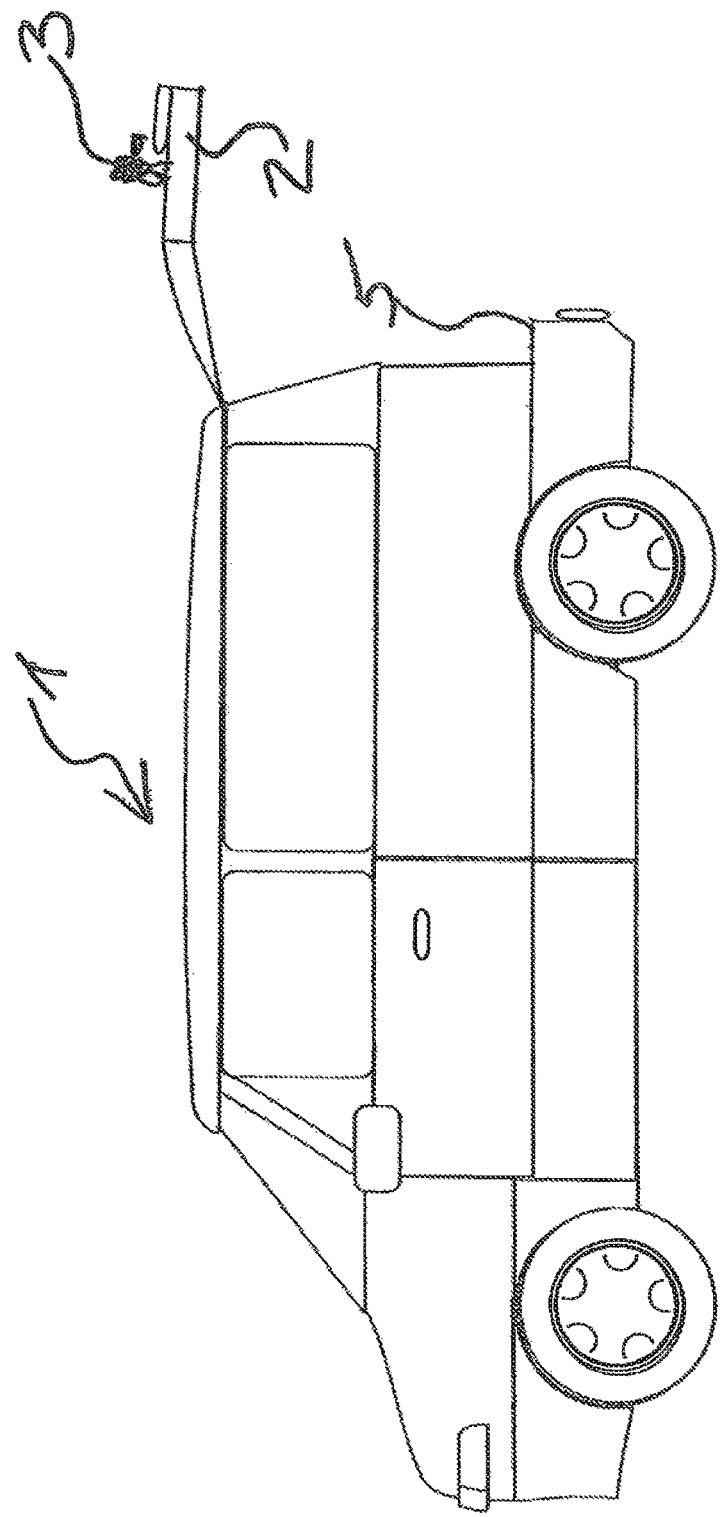

FIG. 1 shows a motor vehicle implemented as a pickup truck, shown with a closed gate, FIG. 2 shows the motor vehicle implemented as a pickup truck, shown with an open gate, FIG. 3 shows a modular unit according to the principles of the present disclosure with a camera unit, which is in a rest position with the tailgate closed, FIG. 4 shows the modular unit according to the principles of the present disclosure with the camera unit, which is in an operating position with the tailgate closed, FIG. 5 shows the modular unit according to the principles of the present disclosure with the camera unit, which is in an operating position with the gate open, FIG. 6 shows a motor vehicle implemented as a van, shown with a closed gate, and FIG. 7 shows the motor vehicle implemented as a van, shown with an open gate.

DETAILED DESCRIPTION

Example embodiments will now be described more fully with reference to the accompanying drawings. Example embodiments are provided so that this disclosure will be thorough, and will fully convey the scope of those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of moded features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In FIG. 1, a motor vehicle 1 implemented as a pickup truck with a closed gate 2, in particular tailgate, is depicted, wherein the gate 2 is equipped with a schematically shown camera unit 3. The camera unit 3 is in the rest position when it is deactivated. The camera unit 3 is in the operating position when the camera unit 3 is activated in order to visually sense an outside area 6 behind the motor vehicle 1. Now when the user wishes to remove cargo from a cargo area 5 of his pickup truck, he will open the gate 2. As is clearly visible in FIG. 2, even when the gate 2 is open, the camera unit 3 is in the operating position, in which it can reliably sense the outside area 6, shown by the dashed outline 7 behind the motor vehicle 1. As a result, while driving in reverse—illustrated by the arrow R in FIG. 2—a user can reliably detect the obstacle 4, which in the present example is in the form of a dock or wall, located behind the motor vehicle 1, and drive close enough to it that the gate 3 is flush with the obstacle 4.

The process of unloading transported cargo located in the cargo area 5 is significantly improved in this way.

In order to achieve this, the motor vehicle 1 may include a modular unit 10 illustrated in FIGS. 3 to 5. The modular unit 10 is connected in a sealing fashion to an outer panel 11 of the gate 2 of the motor vehicle 1, wherein a sealing element (not shown) is located between the outer panel and the modular unit. In the present case, the modular unit 10 is glued to the outer panel 11, with an adhesive serving simultaneously as connecting member and sealing element here. The modular unit 10 located on the movable gate 2 of the motor vehicle 1 includes the camera unit 3, which serves to sense an outside area 6 behind the motor vehicle 1. In addition, the modular unit 10 is equipped with an actuating unit 12 implemented as a door handle. The actuating unit 12 includes a housing 13 implemented as a shell, with a pivot 14 being located on the housing 13. Swivel-mounted on this pivot 14 is a lever 15, wherein the lever 15 has an energy storage device 9 implemented as a spiral spring, which is unstressed in its rest position. When the lever 15 is actuated, the gate 2 of the motor vehicle 1 is opened. In addition, a pivoting support bracket 16, which likewise is swivel-mounted about the pivot 14, is located in the housing 13. In a rest position, the support bracket 16 is situated in the housing 13, and is held in the housing 13, for example by a retaining element—not shown—implemented as a detent element or spring element, such as a spring element. In the operating position, the support bracket 16 is in a pivoted orientation. The support bracket 16 itself has a recessed handle 17 and a camera housing 18 in which the camera unit 3 is arranged in a sealing manner. The camera unit 3 includes an image acquisition unit 19 having a lens. An electric drive 20 that is connected with supply cables, which are not shown, provides for retraction and extension of the camera unit 3 from the camera housing 18. Reference is made to DE10 2009 060425A1, which is incorporated herein by reference in its entirety, which illustrates a power supply for the camera unit 3, in particular for the electric drive 20.

The actuating unit 12 and the camera unit 3 are connected mechanically through a coupling unit 8, wherein an activation of the actuating unit 12 by the hand of the user can bring the gate 2 into an open position as shown in FIG. 2 and also bring the camera unit 3 into its operating position in this process. This means that even when the gate 2 is open, the camera unit 3 is in an active operating position in order to reliably sense the outside area 6 behind the motor vehicle 1.

The coupling unit 8 can be implemented as follows. The support bracket 16 has an opening 21, wherein the lever 15 is located inside the opening 21 in a pivoting manner. The support bracket 16 and the lever 15 form the coupling unit 8 here. To this end, the support bracket 16 has a stop surface 22 implemented as a coupling surface. When the lever 15 is actuated to open the gate 2, the lever 15 strikes the stop surface 22 and presses the support bracket 16 from its rest position into its operating position in opposition to the force of its energy storage device, in particular spring force.

In addition, the support bracket 16 is equipped with a hinged, spring-mounted protective device 23 implemented as a protective lid, which is set in motion during extension of the image acquisition unit 19. The image acquisition unit 19 strikes the protective device 23, in particular with the lens, and pushes the protective device 23 into its open position. Alternatively, the protective device 23 can also be moved by a separate electric drive or by the electric drive 20 that is associated with the camera unit 3.

Furthermore, a first switch unit 24 and a second switch unit 25 are arranged on the housing 13, wherein the switch units 24, 25 are implemented as limit switch units. The switch units 24, 25 serve to deactivate or activate the electric drive unit associated with the camera unit 3 and/or to deactivate or activate the image acquisition unit 19.

Additionally provided on the housing 13 or alternatively on the support bracket 16 is a first damping element 26 that is located at least partially between the housing 13 and the support bracket 16 when the support bracket 16 is in the rest position. Also arranged on the housing is a second damping element 27 that is located between the housing 13 and the support bracket 16 when the support bracket 16 is in the operating position. The damping elements 26, 27 additionally improve the positioning of the support bracket 16 and, thus, also the positioning of the camera unit 3.

The operating principle of the modular unit 10 is explained below. In FIG. 3, the camera unit 3 is in its rest position and the support bracket 16 is in its rest position. In this state, the camera unit 3 is deactivated. When the user actuates a switching device, as for example the reverse gear, or a separate switch in the vehicle, or a button on the radio remote control, or a mobile smart phone, then the camera unit 3 is moved to its operating position as shown in FIG. 4. Accordingly, the image acquisition unit 19 is moved toward the protective device 23 by the electric drive 20 and strikes an inner wall of the protective device. The spring-mounted protective device 23 is pushed into an open position and is held by the camera unit 3 in opposition to the spring force. The camera unit 3 is now located at least partially outside the camera housing 18, and can reliably acquire images of the outside area 6 behind the motor vehicle 1. The support bracket 16 remains in its rest position. As a result, the outside area 6 behind the motor vehicle 1 is reliably sensed with the gate 2 closed. This can take place when the motor vehicle 1 is traveling as well as when it is stationary. When the switching device is actuated again, the image acquisition unit 19 of the camera unit 3 is moved back to its rest position by means of the electric drive 20. During the return motion of the image acquisition unit 19, the spring-preloaded protective device 23 automatically moves back to its closed position.

To unload the cargo area of the pickup truck, or alternatively the luggage compartment of a van, the user actuates the lever 15 of the actuating unit 12. The lever 15 is manually moved to the stop surface 22 by the hand of a user, as is shown in detail in FIG. 3 by the arrow P. In another step, the lever 15 strikes the stop surface 22 and pushes the support bracket 16 out of the housing 13. Pushing the support bracket 16 out can also be motor-assisted or even fully motorized. The support bracket 16, which, like the lever 15, is swivel-mounted about the pivot 14, is then moved from its rest position into its operating position. The support bracket 16 is secured in its rest position by a retaining element, not shown, that is released by actuation of the lever 15. In the course of actuation of the actuating unit 12, in particular of the lever 15, the gate 2 is pivoted by 90°, namely from the closed position illustrated in FIG. 1 into the open position shown in FIG. 2. During this manual actuation of the actuating unit 12, the pivoting motion of the support bracket 16 follows the natural hand movement of the user so that opening of the gate 2 can be carried out conveniently by the user. As a result of the pivoting of the gate 2, the support bracket 16 is pivoted outward due to the action of gravity on the support bracket until the support bracket 16 strikes the damping element 26, which is arranged on the housing 13 of the actuating unit 12.

When the support bracket 16 strikes the second damping element 26, the support bracket 16 has reached its operating position. In this process, the second switch unit 25 is actuated by the support bracket 16 shortly before or upon reaching the operating position. The actuation of the second switch unit 25 deactivates the electric drive 20, which is to say that the electric drive 20 stops or ends the extension of the image acquisition unit 19. Consequently, overheating of the electric drive 20 is prevented and energy is saved. At the same time, or shortly before or after this, the image acquisition unit 19 is activated due to the actuation of the second switch unit 25 in order to visually sense the outside area behind the motor vehicle 1. In this state, as shown in FIG. 5, the camera unit 3, in particular the image acquisition unit 19, is in an active operating position, the support bracket 16 is in its operating position, and the gate 2 is in the open position. However, reliable sensing of the outside area behind the motor vehicle 1 is nevertheless possible because of the modular unit 10.

When closing the gate 2, the user will use the gate 2 and/or the actuating unit 12. By means of the pivoting of the gate 2 from the open position back to the closed position, the support bracket 16 is moved back into the housing 13 again due to the dead weight of the support bracket 16 and the components located thereon. When the support bracket 16 is moved into the housing 13, the second switch unit 25 is actuated once again by the support bracket 16. The image acquisition unit 19 is moved back into its rest position as a result of the actuation of the second switch unit 25. When the support bracket 16 reaches the housing 13, the first switch unit 24 is actuated by the support bracket 16. The electric drive is stopped as a result of the actuation of the first switch unit 24. In the event that the first switch unit 24 is not actuated by the support bracket 16, a signal that the gate 2 may not be properly latched is displayed to the user.

In order to minimize noise when the support bracket 16 strikes the housing 13, the first damping element 26 is arranged on the housing 13. When the support bracket 16 is situated in its rest position, the first damping element 26 is located between the support bracket 16 and the housing 13.

Shown in FIGS. 6 and 7 is a van implemented as motor vehicle 1. This van includes a similar modular unit 10 to the one in the pickup truck. The van differs only in that the gate 2 is pivoted upward to reach its open position. However, in a van an electric drive is suitable for moving the support bracket 16, because gravity ensures that the support bracket 16 otherwise remains in its rest position when the gate 2 is opened.

The datum plane B, which represents the ground, is depicted in FIGS. 3 to 5 for clearer understanding.

Additional alternative embodiments of the modular unit 10 are possible. Thus, provision can be made for the support bracket 16 to be provided with an energy storage device, with the energy storage device being unstressed in the rest position of the support bracket 16. In some configurations, the support bracket 16 may be movable out of and/or into the housing 13 by means of an electric drive. Alternatively, the modular unit 10 according to the invention can also be used with doors of the motor vehicle. The opening 21 of the modular unit 10 can also be implemented as a recess. The second switch unit 25 can also be used to verify correct extension of the camera unit 3. As the support bracket 16 extends, said support bracket 16 can actuate the first switch unit 24 first, followed by actuation of the second switch unit 25. If actuation of the second switch unit 25 does not occur during a predetermined period of time, then an audible or visual alarm is signaled to the user indicating that the support bracket 16 has not reached its operating position, and consequently correct sensing of the outside area 6 behind the motor vehicle 1 is not possible. The switch units 24 and/or 25 can also be used to simply generate a switching signal for opening or closing the gate 2. Thus, for example, the lever 15 can also actuate the switch unit 25 to initiate an opening or closing process for a lock associated with the gate 2 or door. It is likewise possible to replace the lever 15 with a microswitch. Actuation of the microswitch causes motor-driven movement of the support bracket 16 into its rest position or operating position. In this case, the coupling unit 8 is composed electrically of the microswitch and an electric drive associated with the support bracket 16. In addition, a retaining element implemented as a detent element and/or spring element can also be associated with the support bracket 16 to secure the support bracket 16 in its rest position and/or operating position. The switch units 24, 25 can also be used to release or latch the lock of the gate 2.

The foregoing description of the embodiments has been provided for purposes of illustration and description. It is not intended to be exhaustive or to limit the disclosure. Individual elements or feature of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modular unit located on a door or tailgate of a motor vehicle and comprising:
at least one camera unit for sensing an outside area;
an actuating unit for opening the door or tailgate of the motor vehicle; and
a mechanical or electrical coupling unit for connecting the camera unit and the actuating unit;
wherein the camera unit can be brought into an operating position upon activation of the actuating unit, and in the operating position the camera unit actively visually senses the outside area located behind the motor vehicle,
wherein upon activation of the actuating unit the tailgate or door can be brought into an open position and the camera unit can be brought into the operating position by the coupling unit, and
wherein the camera unit is in an active operating position for sensing the outside area located behind the motor vehicle when the door or tailgate is open.

2. The modular unit according to claim 1, wherein the actuating unit includes a shell in which a pivoting support bracket is located.

3. The modular unit according to claim 2, wherein the support bracket includes a recessed handle and a camera housing in which the camera unit is arranged in a sealing manner.

4. The modular unit according to claim 2, wherein a pivoting lever is located on the shell.

5. The modular unit according to claim 4, wherein the lever or the support bracket are designed to rotate about a pivot located on the shell.

6. The modular unit according to claim 5, wherein the lever has an energy storage device, and wherein the energy storage device is unstressed in a rest position.

7. The modular unit according to claim 4, wherein the support bracket and the lever are designed to rotate about a common pivot.

8. The modular unit according to claim 4, wherein the support bracket has an opening or recess, and the lever is pivotally located inside the opening or recess.

9. The modular unit according to claim 4, wherein the support bracket includes a stop surface, and wherein the stop surface and the lever constitute the coupling unit.

10. The modular unit according to claim 2, wherein the support bracket serves as the camera housing for the camera unit.

11. The modular unit according to claim 2, wherein the support bracket is equipped with a hinged protective lid that is configured to be set in motion by an electric drive or a movement of an image acquisition unit associated with the camera unit when the image acquisition unit extends.

12. The modular unit according to claim 11, wherein the modular unit includes at least one limit switch unit for deactivating or activating an electric drive unit associated with the camera unit or for deactivating or activating the image acquisition unit.

13. The modular unit according to claim 2, further comprising at least one damping element located on the shell or on the support bracket, wherein the at least one damping element is located at least partially between the shell and the support bracket when the support bracket is in a rest position.

14. The modular unit according to claim 2, wherein the support bracket includes an energy storage device, and wherein the energy storage device is unstressed in a rest position of the support bracket.

15. The modular unit according to claim 2, wherein the support bracket is moveable out of or into the shell by an electric drive.

16. The modular unit according to claim 1, wherein the motor vehicle includes a pickup truck or van, and wherein the tailgate is pivotable by at least 90° from a closed position.

17. A gate assembly for a vehicle, the gate assembly comprising:
- a gate being movable between a closed position and an open position relative to the vehicle;
- a support bracket supported by the gate, the support bracket being pivotable between an open position and a closed position relative to the gate; and
- a sensor supported by the support bracket, the sensor being translatable between a stowed position and an operating position such that the sensor is operable to (i) sense an area outside of the vehicle when the support bracket is in the open position and (ii) sense the area outside of the vehicle when the support bracket is in the closed position.

18. The gate assembly according to claim 17, wherein the sensor is (i) translatable in a direction parallel to a ground surface when the support bracket is in the open position and (ii) is translatable in a direction parallel to the ground surface when the support bracket is in the closed position.

19. The gate assembly according to claim 17, wherein the sensor faces a first direction when the support bracket is in the open position, and wherein the sensor faces the first direction when the support bracket is in the closed position.

20. The gate assembly according to claim 17, further comprising:
- a housing in which the support bracket is located; and
- a lever pivotally coupled to the housing, wherein the lever is operable to pivot the support bracket from the closed position to the open position.

21. The gate assembly according to claim 17, wherein the sensor is at least partially disposed within the gate in the stowed position.

* * * * *